(12) United States Patent
Witas et al.

(10) Patent No.: US 11,315,025 B2
(45) Date of Patent: Apr. 26, 2022

(54) METHOD AND SYSTEM FOR FORECASTING INFORMATION BASED ON EVENTS AND CRITERION

(71) Applicant: Viant Technology LLC, Irvine, CA (US)

(72) Inventors: Adrian Witas, Los Angeles, CA (US); Varoujan Bedirian, Los Angeles, CA (US)

(73) Assignee: VIANT TECHNOLOGY LLC, Irvine, CA (US)

( * ) Notice: Subject to any disclaimer, the term of this patent is extended or adjusted under 35 U.S.C. 154(b) by 867 days.

(21) Appl. No.: 16/152,223

(22) Filed: Oct. 4, 2018

(65) Prior Publication Data

US 2019/0287001 A1    Sep. 19, 2019

Related U.S. Application Data

(60) Provisional application No. 62/642,367, filed on Mar. 13, 2018.

(51) Int. Cl.
G06F 16/2458  (2019.01)
G06N 5/04     (2006.01)

(52) U.S. Cl.
CPC ........... *G06N 5/04* (2013.01); *G06F 16/2462* (2019.01)

(58) Field of Classification Search
CPC ...... G06N 5/04; G06F 16/2462; G06Q 10/04; G06Q 30/0202; G06Q 30/02
See application file for complete search history.

(56) References Cited

U.S. PATENT DOCUMENTS

2016/0063389 A1 *  3/2016  Fuchs ................. G06N 7/005
706/12

* cited by examiner

*Primary Examiner* — Michael Pham
(74) *Attorney, Agent, or Firm* — Gates & Cooper LLP

(57) ABSTRACT

A method and system provide the ability to forecast events that match a criterion. Input is received and includes an event set and a criterion. The event set includes events and each of the events is a record with features. Each feature is an instance of a feature type (FT) and feature value (FV) combination. The criterion is a logical statement that specifies a criterion FT, a criterion FV, and an operator. The event set is partitioned and a partition BitSet is built for each partition. Each partition length of each partition BitSet is based on a number of the events. Based on the partition BitSets, a partition FT-FV count is created. For each partition, a partition FT criterion BitSet is created and a partition Criterion BitSet is computed based thereon. The forecast is then computed based on the partition Criterion BitSet.

20 Claims, 7 Drawing Sheets

METHOD AND SYSTEM FOR FORECASTING INFORMATION BASED ON EVENTS AND CRITERION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/642,367, filed on Mar. 13, 2018, with inventor(s) Adrian Witas and Varoujan Bedirian, entitled "BitSet Forecasting," attorneys' docket number 257.98-US-P 1.

This application is related to the following co-pending and commonly-assigned patent application, which application is incorporated by reference herein:

U.S. patent application Ser. No. 15/699,933, filed on Sep. 8, 2017, which issued Oct. 1, 2019 as U.S. Pat. No. 10,430,467 with Adrian Witas, Kyle R. Kincaid, and Varoujan Bedirian, entitled "Method and System for Determining Matching Subjects Provided in a Stimulus,".

BACKGROUND OF THE INVENTION

1. Field of the Invention

The present invention relates generally to computing, outputting, and utilizing metadata for a large dataset. In particular, embodiments of the invention relate to a method, system, apparatus, and article of manufacture for quickly determining and forecasting a count of events and an accurate average aggregate value for those events, followed by the output and utilization of such information.

2. Description of the Related Art

In various domains/industries, given an input of a set of events with various features having values, upon receipt of a specific criterion, it is desirable to determine and forecast the number of events that satisfy such criterion and an average value of the aggregate feature of such satisfying features. Depending on the domain/industry, there can be hundreds, to thousands, to billions of different events received on a daily basis that need to be quickly evaluated to determine if they match a given criteria/set of criteria. Quickly determining how and which criterion/criteria provide a resulting set of events in a dynamic, efficient, and fast manner is not only desirable, but essential to provide satisfactory results/services to clients/customers.

Prior art systems evaluate such events utilizing a brute-force method that matches all events with a criterion/criteria to determine a forecast and/or an aggregate value. The pessimistic brute force complexity is 0 (Event Count*Criterion Feature Type Count). In this regard, such a brute-force method is slow, inefficient, and fails to achieve desired results. Accordingly, what is needed is a system/method for determining/forecasting the number of events that match a defined set of criteria, and determining an accurate average aggregate value for such events in a fast, efficient manner.

SUMMARY OF THE INVENTION

Embodiments of the invention overcome the problems of the prior art by pre-processing an input of events to corresponding metadata and BitSets and upon receipt of criterion performing logical operations on the BitSets to quickly and efficiently forecast matching results. In particular, such processing enables forecasting by reducing the complexity of computing a count of events, an accurate average aggregate value for those events, and a breakdown of feature type restrictiveness in the criterion. Once forecasted, actual generation of a campaign/commodity, engineering design, etc. may be conducted based on the forecasting. Further, real-world physical budgets and/or plans may need to be adjusted/created based on the campaign/commodity/design generation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
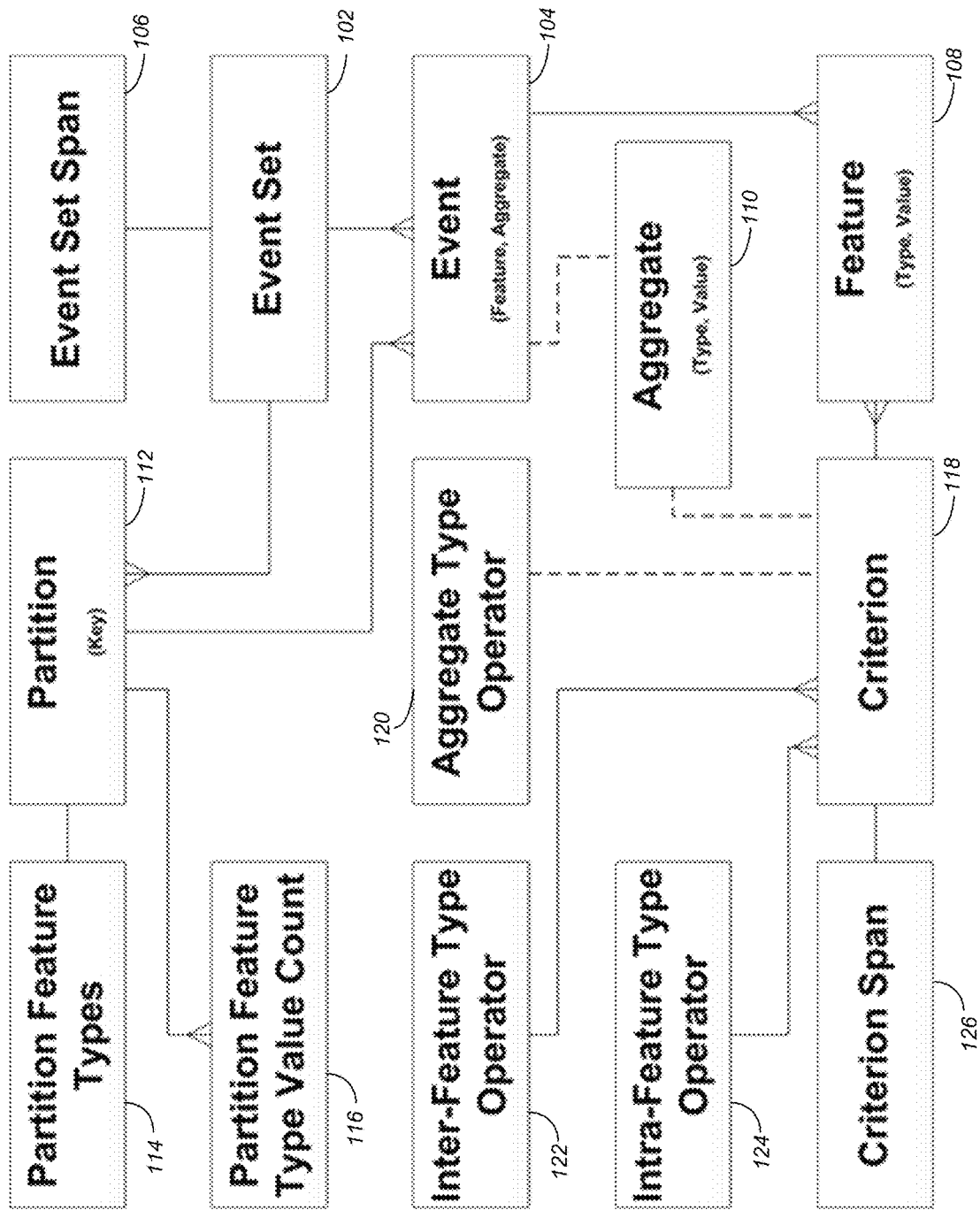
FIG. 1 illustrates a BitSet concept entity-relationship diagram in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Terminology

The terms and definitions set forth below provide the context within which embodiments of the operation may operate.

CPU Core Count: Number of CPUs available on machine.

Event Set: A set of Events used as input.

Event: A record, within an Event Set, with one or more Features, an implied timestamp, and optionally an Aggregate.

Event Set Span: The distance between the oldest and newest Event timestamp across the Event Set.

Feature: An instance of a combination of Feature Type and Feature Value.

Feature Type: One of the two characteristics of a specific Feature, representing a dimension against which to forecast. Within an Event, some Feature Types can have only one Feature Value, others can have multiple.

Aggregate: An instance of combination of Aggregate Type and Aggregate Value.

Aggregate Type: Each Event record may have a single Aggregate Type. An Aggregate Type has a single Aggregate Value. If no Aggregate Type is provided, then embodiments of the invention will not generate an average Aggregate value for matching Events.

Partition Key: A formula with which to divide an Event Set into Partitions made up of smaller subsets of Events. This formula could be based on one or more Feature Types, Feature Values, count of Events, time, or randomization. The main goal of the Partition Key is to enable parallelism by reducing the total count of events in a Partition, but not reducing it all the way to 1, as that would defeat the purpose of partitioning. Further, the Partition Key is meant to split Events, count-wise, in a distributed manner (e.g., by number of Events and/or uniformly) across Partitions. If e.g., due to Partition Key definition, some Partitions end up having orders of magnitude more Events than other Partitions, than this would defeat the purpose as well.

Partition: A set of Events, grouped by Partition Key and time, which will first be analyzed together, before embarking on cross-Partition analysis. The position of each Event record within a Partition is significant information, and is locked down at the point of creating the Partition.

Partition Feature Types: The subset of Feature Types available in a specific Partition, defined as:

Partition Feature Types {
  Partition Key: Value;
  Feature Types: List of Feature Types available in this Partition;
}

Intra-Feature Type Operators (used only for Feature Types):
  EQUAL: =. Event matches Criterion if Event has one of the listed Feature Values in Criterion.
  NOT EQUAL: !=. To match, an Event cannot have any of the listed Feature Values in Criterion.
  Aggregate Type Operator (used only for Aggregate Type):
  GREATER THAN OR EQUAL TO: >=. Used for denoting a range for Aggregate Types only.
  LESS THAN OR EQUAL TO: <=. Used for denoting a range for Aggregate Types only.
  Further operators may include >= and <= for Feature Types.
  Inter-Feature Type Operators: AND or OR. These are for non-Aggregate Types.

Criterion: A logical statement with Feature Type(s), Feature Value(s), Intra-Feature Type Operators, Inter-Feature Type Operators, a Criterion Span, and optionally an Aggregate with an Aggregate Type Operator.

Criterion Span: Interval of time over which to forecast.
Partition Feature Type—Feature Value Count {
Id: Partition Key—Feature Type
Feature Value Count: Map {
  Feature Value: Count
}
}
Word: 64 bits, or more, depending on CPU architecture.

BitSet: A set of 1s and 0s, equal in length to the number of Events being evaluated in a Partition. This is represented by as many words as needed to account for all Events in that Partition. The position of each Event within a BitSet corresponds to the position of that Event record within the Partition. For example, with 200 Events, each BitSet is 200 bits, while technically implemented using 4 Words=ROUNDUP(200/64).

BitSet (0): A BitSet created with all bits cleared to 0. For example, for 4 Events BitSet (0)=[0, 0, 0, 0].

Aggregate rounding: To speed up forecasting calculations, Aggregate Values can be rounded. For example, 73.352 could be rounded to 73.4; 917262 could be rounded to 917300. Precision to round to is up to implementation needs.

Additional Abbreviations:
E denotes Event.
FT denotes Feature Type. Plural, FTs.
FV denotes Feature Value. Plural, FVs.
AT denotes Aggregate Type.
AV denotes Aggregate Value. Plural AVs.
3-digit numbers denote FVs of specific FTs.

FIG. 1 illustrates a BitSet concept entity-relationship diagram in accordance with one or more embodiments of the invention. As illustrated and described above, the Event Set 102 contains multiple events 104. Further, the event set is associated with an event set span 106 that defines the distance between timestamps across the Events 104 in the Event Set 102. Each Event 104 consists of record that contains one or more Features 108 and a potential Aggregate 110.

Each Feature 108 is an instance of a combination of a Feature Type and a Feature Value. The Aggregate 110 is an instance of a combination of an Aggregate Type and a single Aggregate Value. An exemplary Aggregate 110 is a price.

An Event Set 102 can be divided into multiple partitions 112 that are grouped by a partition key. Accordingly, each partition 112 has multiple events 102. Further, each partition 112 has a subset of feature types 114 that are available in a specific partition. The number of different feature type values in each partition 112 is counted/summed in the partition feature type value count 116.

As described above, the criterion 118 is a logical statement that is used to select/filter the events 104. Accordingly, the criterion 118 may specify one or more features 108 (e.g., feature type and feature value) and may optionally specify an aggregate 110 with an aggregate type operator 120. The aggregate type operator specifies an inequality (e.g., greater than or equal to OR less than or equal to). For the features 108, the criteria 118 may be based on one (or both) of two different types of operators—inter-feature type operator 122 and/or intra-feature type operator 124. Inter-feature type operators 122 are logical AND/OR operations. Intra-feature type operators 124 specify whether a feature value is equal to and/or not equal to a specified feature value.

In addition, the criterion 118 specifies a time period/interval over which to evaluate/filter the features/aggregates. This time period/interval is referred to as the Criterion Span 126. Criterion Span is a forecasting (looking forward) window.

Methodology

One or more embodiments of the invention provide the ability to forecast the total number of records that match a particular specified criteria. There are two primary phases/steps that may be used to perform the matching/filtering of the events 104 based on specified criteria:

(1) Pre-processing—where all events 104 to be evaluated (e.g., features 108 and aggregates 110) are known/have been received and are pre-processed (e.g., offline); and (2) Criterion 118 Processing—when the criterion 118 arrives/is available and is used to evaluate/filter the events 104 to perform the forecasting.

Figure 2:
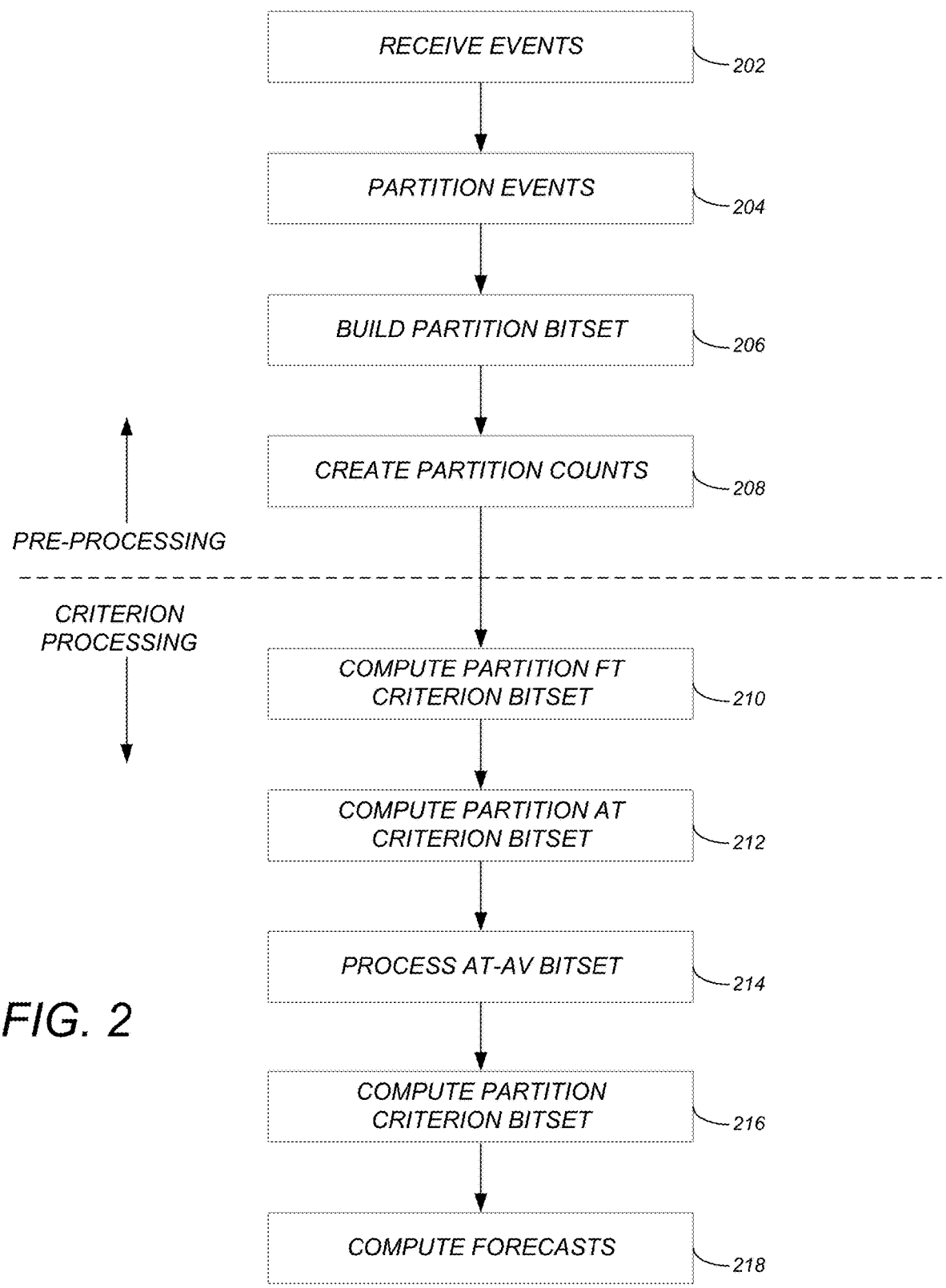
FIG. 2 illustrates the logical flow for counting events that comply with a defined set of criteria in accordance with one or more embodiments of the invention.

FIG. 2 illustrates the logical flow for counting events that comply with a defined set of criteria in accordance with one or more embodiments of the invention.

Steps 202-208 provide for pre-processing of the events 104 in an event set 102. At step 202, input in the form of the event set 102 are received. In this regard, the event set 102 consists of records that each represent an event consisting of a feature and/or an aggregate along with an implied time stamp. Thus, the input received at step 202 may include a set of feature type (FT)-feature value (FV) combinations along with an optional aggegate type (AT)-aggregate value (AV) combination. For example, an exemplary event may comprise:

Time: 11; $FT_1$: 100; $FT_2$: 300; $FT_3$: 500; AT: 1.123187

Each event 104 may represent a variety of different information elements depending on the industry in which it is used (see industry specific details below).

At step 204, the events 104 are partitioned into partitions 112. Such a partitioning may include the rounding of aggregate values (e.g., to reduce the dimensionality of aggregate types). In one or more embodiments, such a rounding may round to tenths or hundredths (e.g., rounding a price aggregate to one digit beyond the decimal place). To divide the events 104 into partitions 112, a partition key is determined/decided. As described above, the formula for determining the partition key may be based one or more feature types, feature values, or count of events (e.g., a specified number of events in each partition). Further, the partition key serves to reduce a total count of the events in each partition and attempts to split the events, count-wise, across the partitions in a distributed manner which may be uniform. Such partitioning enables efficient processing of the events. Once the partition key has been decided/determined, the event set 102 is partitioned into the partitions 112.

At step 206, having created partitions 112 using the partition key formula, a partition BitSet is built for each partition. To build the partition BitSet, available feature types and optional aggregate type are gathered into a partition feature type definition (i.e., a list of the various feature types and optional aggregate type in each partition). Once feature types are gathered, for each FT-FV combination (and the optional AT-AV combination(s)), a partition BitSet is built. The build process begins with BitSet (0) (i.e., every bit is equal to 0) and the bit at position (P) is set to 1 if the FT-FV combination is found in the Event (E) 104 that is represented by potision (P). Each partition's length of BitSets equals the number of events 104 in that partition 112. Thus, for each of the AT-AV combinations, a bit at position (P) is set to 1 when an AT-AV combination is found in the event (E) represented by position (P). Further, only for AT, the resultants BitSets may be sorted in ascending order by AV.

At step 208, Partition FT-FV and AT-AV counts are created. The counts list the number of occurrences of each FV, within a partition-FT combination, and optionally of each AV within an optional partition-AT combination.

Once the criterion 118 is received/available, criterion processing is performed as defined in steps 210-218. The criterion 118 consists of a logical statement that specifies a set of criterion FT-FV combinations, a set of logical operators, and optionally a criterion AT-AV. Steps 210-216 are performed for each partition.

Figure 3:
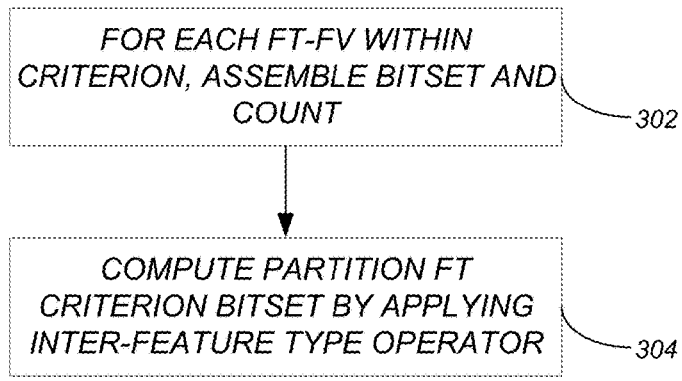
FIG. 3 illustrates the logical flow for step 210—computing the partition FT criterion BitSet in accordance with one or more embodiments of the invention.

FIG. 3 illustrates the logical flow for step 210—computing the partition on FT criterion BitSet in accordance with one or more embodiments of the invention.

Figure 4:
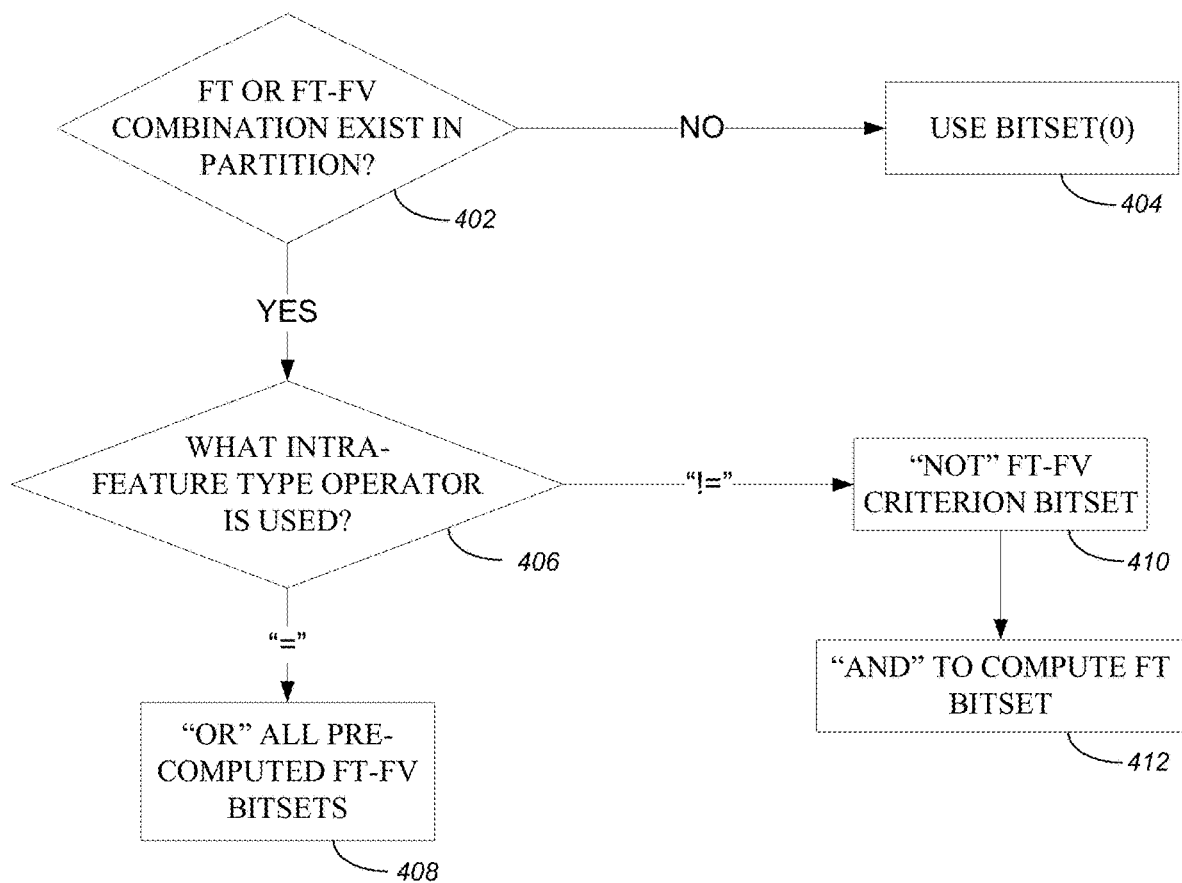
FIG. 4 illustrates the logical flow for assembling the BitSet and count of step 302 of FIG. 3 in accordance with one or more embodiments of the invention.

At step 302, for each FT-FV criterion combination within the criterion 118, a single BitSet (referred to as an FT-FV Criterion BitSet) is assembled, its count (referred to as FT-FV criterion count) is computed, and both the BitSet and count are stored. FIG. 4 illustrates the logical flow for assembling the BitSet and count of step 302 of FIG. 3 in accordance with one or more embodiments of the invention. Note that a number of bits in the FT-FV criterion BitSet correpsonds to a number of events in the partition. For each FT-FV Criterion combination, an FT-FV Criterion BitSet of all zeroes (0) is used, and a bit at position (P) is set to 1 when the FT-FV Criterion combination is found in the event (E) represented by position (P).

At step 402, a determination is made regarding whether the FT or FT-FV combination within the input criterion 118 exists in the partition 112. If the combination does not exist, the BitSet (0) is used at step 404. Thus, for each FT-FV Criterion combination having a common FT, the FT-FV Criterion BitSets are combined to create a single FT Criterion BitSet by the process described below.

If the combination exists in the partition, a determination is made at step 406 regarding what type of intra-feature operator 124 is used (for the FT-FV combination). If the "=" intra-feature type operator 124 is used, a logical OR operation is performed against all of the pre-computed FT-FV Criterion BitSets at step 408.

If a "!=" intra-feature type operator 124 is used, then a logical NOT operation is performed against the (precomputed) FT-FV Criterion BitSets at step 410. Thereafter, at step 412, a logical AND operator is performed against the results to compute the FT Criterion BitSet. The reason to 'NOT and then AND together' vs. to 'OR together and then NOT' is because the former is cheaper computationally when BitSets are used in concert with stepwise AND-ing across BitSets. Further, embodiments of the invention stop computing when a stepwise AND operation yields BitSet (0).

Returning to FIG. 3, at step 304, the Partition FT criterion BitSet is computed by applying the inter-feature type operator 122 (OR or AND) found in the Criterion 118 between computed criterion FT-criterion FV combinations found/computed in the Criterion 118.

Figure 5:
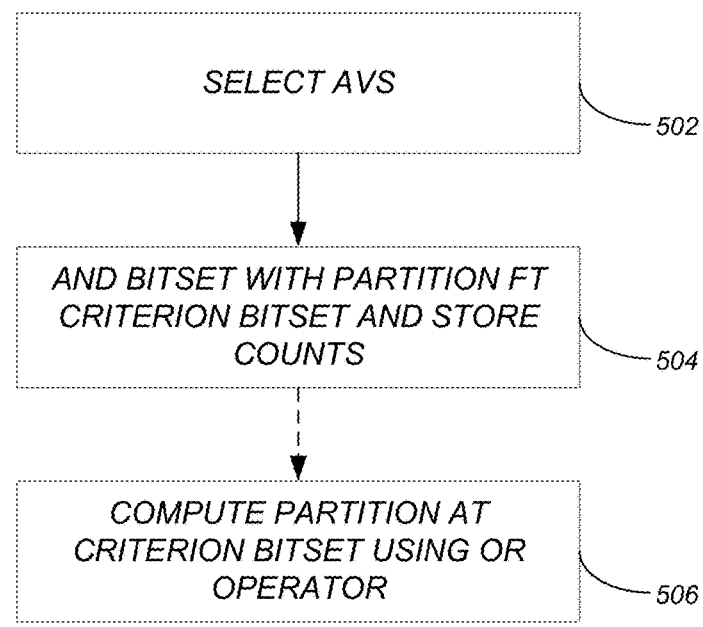
FIG. 5 illustrates the detailed logical flow for computing the Partition AT Criterion BitSet in step 212 of FIG. 2 in accordance with one or more embodiments of the invention.

Returning to FIG. 2, at step 212, the Partition AT Criterion BitSet is computed. FIG. 5 illustrates the detailed logical flow for computing the Partition AT Criterion BitSet in step 212 of FIG. 2 in accordance with one or more embodiments of the invention. In this regard, the input may optinally include an aggregate that consists of an instance of a combination of an aggregate type (AT) and an aggregate value (AV). At step 502, a subset of AT-AV BitSets is selected corresponding to matching AT-AV in the Criterion. At step 504, for each Partition AT Criterion BitSet, a logical AND is performed between the respective BitSet and the Partition FT Criterion BitSet, and the counts are stored. In other words, for each selected AV BitSet, a logical AND operation is performed between the partition AT-AV BitSet and the partition FT Criterion BitSet.

Step 506 is an optional step that is only performed if the Criterion 118 has an AT. If the AT is present in the criterion 118, Partition AT Criterion BitSet is computed by applying the OR logical operator across resultant BitSets.

Figure 6:
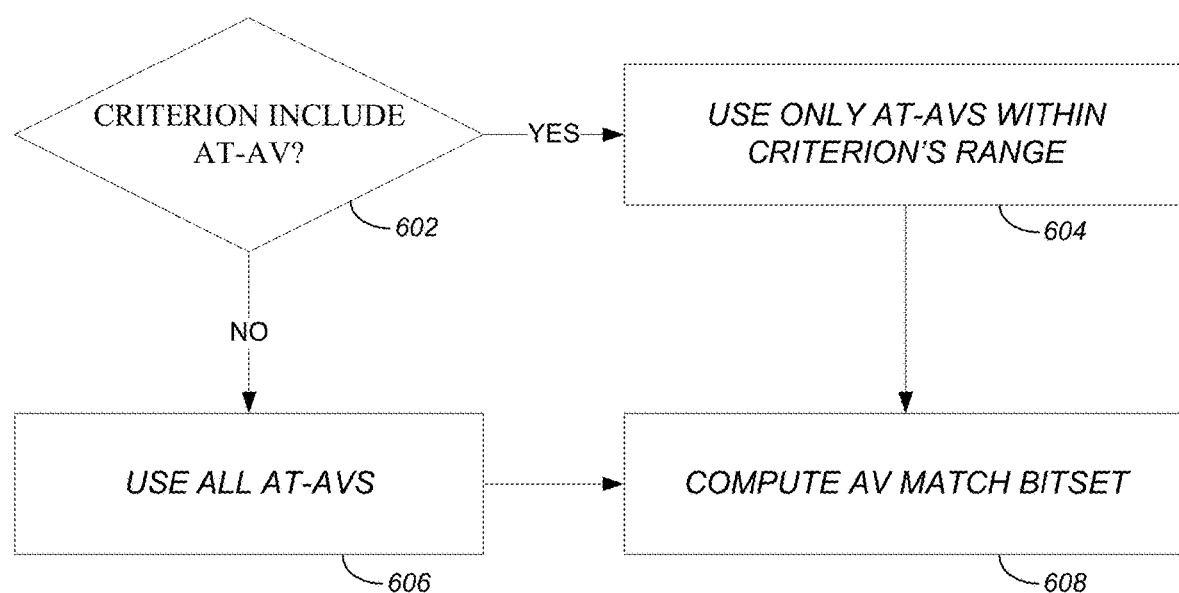
FIG. 6 illustrates the logical flow for processing each AT-AV BitSet at step 214 of FIG. 2 in accordance with one or more embodiments of the invention.

Returning to FIG. 2, at step 214, each AT-AV BitSet within the partition 112 is processed. FIG. 6 illustrates the logical flow for processing each AT-AV BitSet at step 214 of FIG. 2 in accordance with one or more embodiments of the invention. At 602, a determination is made regarding whether the Criterion 118 includes AT-AV (i.e., an Aggregate 110). If the Criterion 118 includes an Aggregate 110, only the AT-AVs within the Criterion's range are used at 604. If the Criterion 118 does not have an Aggregate 110, all AT-AVs are used at 606. At 608, the AV Match BitSet is computed by applying a logical AND operator between the FT Criterion BitSet and the AV BitSet. In other words, for each partition AT-AV BitSet within each partition, if the criterion includes an AT-AV and a range, only events having AT-Avs within the range of the AT-AV specified are used (otherwise all AT-AVs are used), and the partition AV Match BitSet is computed by applying a logical AND operation between the FT Criterion BitSet and the partition AT-AV BitSet.

At step 216, the Partition Criterion BitSet is computed (based on the partition FT criterion BitSet). If AT is provided, a logical AND operator is applied between the Partition FT Criterion BitSet and the Partition AT Criterion BitSet. If AT is not provided, the Partition FT Criterion BitSet is used. The bits in the Partition Criterion BitSet are then summed/counted to generate a count of Events in the Partition 112 matching the AV available in Events 104.

Figure 7:
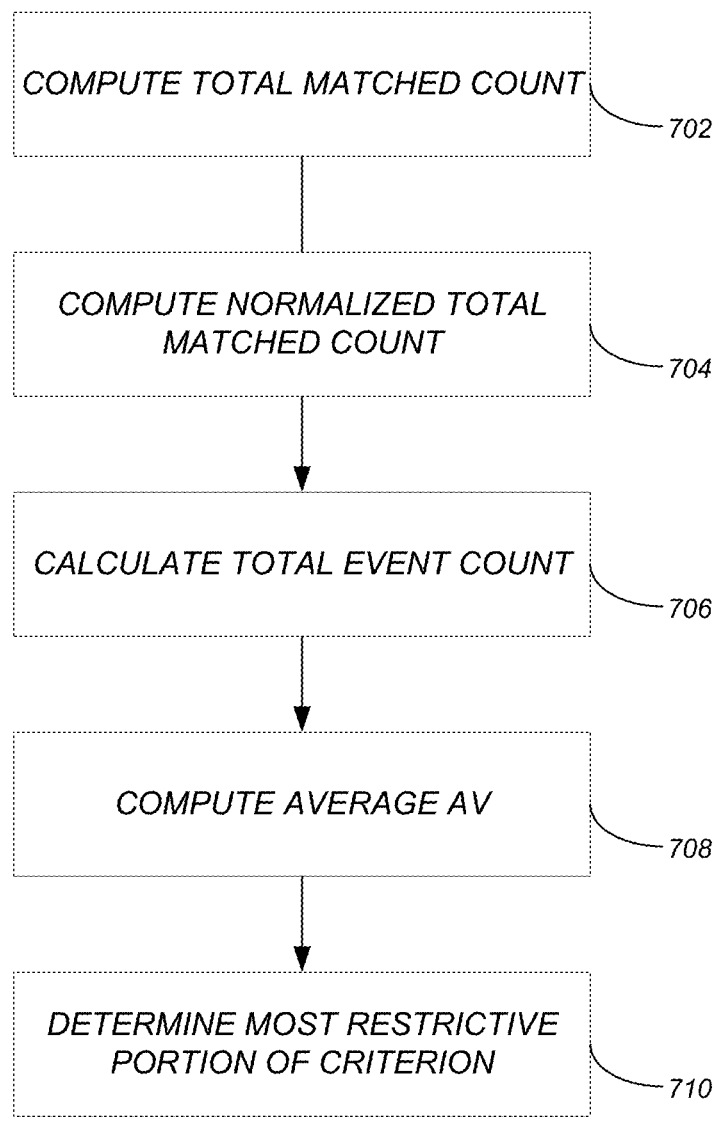
FIG. 7 provides an overview of the forecasts that are computed in step 218 of FIG. 2 in accordance with one or more embodiments of the invention.

At step 218, the forecasts are computed. FIG. 7 provides an overview of the forecasts that are computed in step 218 of FIG. 2 in accordance with one or more embodiments of the invention. At 702, the counts from each Partition Criterion FT BitSet are summed to produce a Total Matched Count.

At 704, the Total Matched Count per normalized unit of time is computed by multiplying the Total Matched Count produced in step 702 by the Criterion Span 126 and dividing by the Event Set Span.

At 706, the total count of Events 104 in the Event Set 102 is calculated.

At 708, using all AV Matches for the Criterion 118, an accurate average AV is computed. An estimated average AV may also be generated (by performing at pre-Criterion time, certain operations currently done at post-Criterion time).

At 710, for each FT-FV combination in the Criterion 118, roll up, across Partitions 112, individual FT counts and their FV counts to find the most restrictive portion of Criterion 118 (i.e., the smallest values). If a Criterion FT-FV combination does not exist in the Partition 112, and the Intra-Feature Type Operator 124 is '=' then 0 is used as the count, otherwise the Event count in the Partition 112 is used as the count.

Exemplary Processing

While FIGS. 2-7 illustrate the logical flow for performing the forecasting, an example data set that is processed in accordance with this logical flow may be useful to gain a better understanding. Table A illustrates an exemplary data set that may be processed in accordance with one or more embodiments of the invention.

TABLE A

Exemplary Input

Event Set (Event Set Span = 3)

Partition 1

Event ($E_1$): $FT_1$: 100;   $FT_2$: 300;       $FT_3$: 500;   AT: 1.2
Event ($E_2$): $FT_1$: 100;   $FT_2$: 300, 400;  $FT_3$: 600;   AT: 1.8
Event ($E_3$): $FT_1$: 200;   $FT_2$: 400;       $FT_3$: 700;   AT: 2.4

TABLE A-continued

Exemplary Input

Event Set (Event Set Span = 3)

Event ($E_4$): $FT_1$: 200;   $FT_2$: 300;       $FT_3$: 500;   AT: 1.4
Partition 2

Event ($E_1$): $FT_1$: 100;   $FT_2$: 300;       $FT_3$: 700;   AT: 1.2
Event ($E_2$): $FT_1$: 100;   $FT_2$: 300, 400;  $FT_3$: 500;   AT: 2.5
Event ($E_3$): $FT_1$: 200;   $FT_2$: 400;       $FT_3$: 700;   AT: 1.8
Criterion 1:

$FT_1$ = 100 AND $FT_2$ = 300, 800 AND $FT_3$ NOT IN (900, 950)
Criterion Span = 9
AT <= 2.0
Criterion 2:

$FT_1$ = 100 AND $FT_2$ = 300, 800 AND $FT_3$ NOT IN (900, 950)
Criterion Span = 9

As described below, the first example is based on Criterion 1 from Table A while the second example is based on Criterion 2 from Table A.

Example 1—Criterion 1

As illustrated in Table A, the following Events 104 and Criterion 118 are input at step 202:

Events:

1. Time: 11;  $FT_1$: 100;  $FT_2$: 300;       $FT_3$: 500;  AT: 1.23187
2. Time: 11;  $FT_1$: 100;  $FT_2$: 300, 400;  $FT_3$: 600;  AT: 1.75361
3. Time: 12;  $FT_1$: 200;  $FT_2$: 400;       $FT_3$: 700;  AT: 2.36810
4. Time: 12;  $FT_1$: 200;  $FT_2$: 300;       $FT_3$: 500;  AT: 1.40181
5. Time: 13;  $FT_1$: 100;  $FT_2$: 300;       $FT_3$: 700;  AT: 1.21192
6. Time: 13;  $FT_1$: 100;  $FT_2$: 300, 400;  $FT_3$: 500;  AT: 2.49810
7. Time: 13;  $FT_1$: 200;  $FT_2$: 400;       $FT_3$: 700;  AT: 1.81628

Criterion 1:

$FT_3$=100 AND $FT_2$=300, 800 AND $FT_3$ NOT IN (900, 950)

Criterion Span=9

AT<=2.0

At step 204, the three steps of (1) reducing the dimensionality, (2) deciding on a partition key, and (3) partitioning the event set 102 are performed. Accordingly, the AVs are rounded to 1 digit beyond the decimal place. In the example, the formula used for the partition key is to place a maximum of 4 Events 104 in a partition 112. To partition the event set 102, the Event Set Span is first computed: Max time (Time: 13)−Min time (Time: 11)=2. Based on the Event Set Span and the partition key, the Events 104 in the input data are partitioned into Partitions 112 as set forth in Table B:

TABLE B

Partitioned Events

Partition 1 Events:

1. Event ($E_1$) Partition: $FT_1$: 100;  $FT_2$: 300;       $FT_3$: 500;  AT: 1.2
   1; Time: 11;
2. Event ($E_2$) Partition: $FT_1$: 100;  $FT_2$: 300, 400;  $FT_3$: 600;  AT: 1.8
   1; Time: 11;
3. Event ($E_3$) Partition: $FT_1$: 200;  $FT_2$: 400;       $FT_3$: 700;  AT: 2.4
   1; Time: 12;
4. Event ($E_4$) Partition: $FT_1$: 200;  $FT_2$: 300;       $FT_3$: 500;  AT: 1.4
   1; Time: 12;

TABLE B-continued

Partitioned Events

Partition 2 Events:

1. Event ($E_1$) Partition: $FT_1$: 100; $FT_2$: 300; $FT_3$: 700; AT: 1.2 2; Time: 13;
2. Event ($E_2$) Partition: $FT_1$: 100; $FT_2$: 300, $FT_3$: 500; AT: 2.5 2; Time: 13; 400;
3. Event ($E_3$) Partition: $FT_1$: 200; $FT_2$: 400; $FT_3$: 700; AT: 1.8 2; Time: 13;

Step 206 provides for building the Partition BitSets. The first step in this process is to create the Partition definitions for each Partition. In particular, the available FTs are gathered into a Partition FT definition for each partition. For Partition 1:

Create Partition 1 FT definition:

Partition FT {
    Partition Key 1
    FTs: $FT_1$; $FT_2$; $FT_3$; AT
}

As described above, for each FT-FV combination (and the AT-AV combination), a Partition BitSet is built. The FT-FV and AT-AV BitSets for Partition 1 are set forth in Table C below.

TABLE C

Partition 1 FT-FV and AT-AV BitSets
Create Partition 1 FT-FV and AT-AV BitSets [$E_1$, $E_2$, $E_3$, $E_4$]

$FT_1$:
  100: [1, 1, 0, 0]
  200: [0, 0, 1, 1]
$FT_2$:
  300: [1, 1, 0, 1]
  400: [0, 1, 1, 0]
$FT_3$:
  500: [1, 0, 0, 1]
  600: [0, 1, 0, 0]
  700: [0, 0, 1, 0]
AT (sorted):
  1.2: [1, 0, 0, 0]
  1.4: [0, 0, 0, 1]
  1.8: [0, 1, 0, 0]
  2.4: [0, 0, 1, 0]

At step 208, the Partition FT-FV counts are created. The counts for Partition 1 are set forth in Table D below.

TABLE D

Partition 1 FT-FV Counts
Create Partition 1 FT-FV Counts

Partition FT-FV Count {
  Id: 1-$FT_1$
  FV Count: {
    100: 2,
    200: 2
  }
}
Partition FT-FV Count {
  Id: 1-$FT_2$
  FV Count: {
    300: 3,
    400: 2
  }
}

TABLE D-continued

Partition 1 FT-FV Counts
Create Partition 1 FT-FV Counts

Partition FT-FV Count {
  Id: 1-$FT_3$
  FV Count: {
    500: 2,
    600: 1,
    700: 1
  }
}
Partition AT-AV Count {
  Id: 1-AT
  AV Count: {
    1.2: 1,
    1.4: 1,
    1.8: 1,
    2.4: 1
  }
}

The creation of the FT definitions, FT-FV/AT-AV BitSets (step 206) and counts (step 208) are then repeated for Partition 2.

The FT definitions for Partition 2 are:

Partition FT {
    Partition Key 2
    FTs: $FT_1$; $FT_2$; $FT_3$; AT
}

The FT-FV and AT-AV BitSets for Partition 2 are set forth in Table E below.

TABLE E

Partition 2 FT-FV and AT-AV BitSets
Create Partition 2 FT-FV and AT-AV BitSets [$E_1$, $E_2$, $E_3$]

$FT_1$:
  100: [1, 1, 0]
  200: [0, 0, 1]
$FT_2$:
  300: [1, 1, 0]
  400: [0, 1, 1]
$FT_3$:
  500: [0, 1, 0]
  700: [1, 0, 1]
AT (sorted):
  1.2: [1, 0, 0]
  1.8: [0, 0, 1]
  2.5: [0, 1, 0]

The counts for Partition 2 are set forth in Table F below.

TABLE F

Partition 2 FT-FV Counts
Create Partition 2 FT-FV Counts:

Partition FT-FV Count {
  Id: 2-$FT_1$
  FV Count: {
    100: 2,
    200: 1
  }
}
Partition FT-FV Count {
  Id 2-$FT_2$
  FV Count: {
    300: 2,
    400: 2
  }
}

TABLE F-continued

Partition 2 FT-FV Counts
Create Partition 2 FT-FV Counts:

Partition FT-FV Count {
    Id: 2-FT$_3$
    FV Count: {
        500: 1,
        700: 2
    }
}
Partition AT-AV Count {
    Id: 2-AT
    AV Count: {
        1.2: 1,
        1.8: 1,
        2.5: 1,
    }
}

Once all the initial set of events have been processed, when the criterion is available, processing continues with step 210 by computing the Partition FT Criterion BitSet for each partition 112. In this regard, for each FT-FV within the Criterion 118, a single BitSet is computed. If the FT- or FT-FV combination does not exist in the Partition, BitSet(0) is used. Alternatively, if the combination exists, then the intra-feature operator 124 ("=" or "!=") utilized determines the logical operations to perform. For example, for FT$_1$–100, the Criterion 118 uses "=" as the intra-feature operator 124, accordingly, the logical OR operation is used. However, since there is only 1 value, there is no need to perform the OR operation and the BitSet for FT$_1$–100 [1,1,0,0] is used:

| FT$_1$: | | |
|---|---|---|
| FT$_1$-100: | [1, 1, 0, 0] | Count: 2 |
| FT$_1$: Use BitSet for FT$_1$-100: | [1, 1, 0, 0] | Count: 2 |

The next criterion is FT$_2$=300 or 800. Since "=" is used, a logical OR operation is performed for the two FT$_2$ BitSets:

| FT$_2$-300: | [1, 1, 0, 1] | Count: 3 |
|---|---|---|
| FT$_2$-800: | [0, 0, 0, 0] | Count: 0 |
| FT$_2$: OR FT-FV BitSets FT$_2$-300 ([1, 1, 0, 1]) and FT$_2$-800 ([0, 0, 0, 0]): | | |
| | [1, 1, 0, 1] | Count: 3 |

The Criterion for FT$_3$ utilizes "!=". Accordingly, for the count, a logical NOT is performed on the FT-FV combination before counting and the results are combined using a logical AND operator. Since the FT-FV combination for FT$_3$–900 and FT$_3$–950 do not exist in Partition 1, BitSet(0) is used. Lastly, the Partition FT Criterion BitSet is created by applying the Inter-Feature type operator (OR or AND) found in the Criterion—in other words, since the Criterion specifies the different FT-FV combinations are combined using an AND operator, all of the FT BitSets are also combined using an AND operator:

FT$_3$-900 NOT([0, 0, 0, 0]) [1, 1, 1, 1] Count: 4
FT$_3$-950 NOT([0, 0, 0, 0]) [1, 1, 1, 1] Count: 4
FT$_3$: FT$_3$-900 and FT$_3$-950 do not exist, use BitSet (0) ([0, 0, 0, 0]) for each, NOT each one, and finally AND the results: NOT([0, 0, 0,0]) AND NOT ([0, 0, 0, 0]) = [1, 1, 1, 1] AND [1, 1, 1, 1]:
    [1, 1, 1, 1] Count: 4
AND these FT BitSets to create Partition 1 FT Criterion BitSet:
    [1, 1, 0, 0]

At step 212, the Partition 1 AT Criterion BitSet is created. As AT<=2.0 is in the Criterion, the AVs to be used in Partition 1 are 1.2, 1.4 and 1.8, with Partition 1-AV BitSets of [1, 0, 0, 0], [0, 0, 0, 1] and [0, 1, 0, 0] respectively. A logical AND operation is performed between the respective AV BitSet and the Partition FT Criterion BitSet (e.g., [1,1, 0,0]) and the counts are stored:

1.2: [1, 0, 0, 0] AND [1, 1, 0, 0] [1, 0, 0, 0]
Count: 1
1.4: [0, 0, 0, 1] AND [1, 1, 0, 0] [0, 0, 0, 0]
Count: 0
1.8: [0, 1, 0, 0] AND [1, 1, 0, 0] [0, 1, 0, 0]
Count: 1

Thereafter (also within step 212), since the criterion has an AT, the Partition AT Criterion BitSet is computed by applying the OR logical operator across resultant BitSets:

OR-ing results in Partition 1 AT Criterion BitSet: [1, 1, 0, 0]
Count: 2

At step 214, the AT-AV BitSet is processed. In particular, the AV Match BitSet is computed by applying a logical AND operator between the FT Criterion BitSet and the AV BitSet:

1.2: AND Partition 1 AV BitSet ([1, 0, 0, 0]) with FT Criterion BitSet ([1, 1, 0, 0]):
    Result: [1, 0, 0, 0] Count: 1
1.4: AND Partition 1 AV BitSet ([0, 0, 0, 1]) with FT Criterion BitSet ([1, 1, 0, 0]):
    Result: [0, 0, 0, 0] Count: 0
1.8: AND Partition 1 AV BitSet ([0, 1, 0, 0]) with FT Criterion BitSet ([1, 1, 0, 0]):
    Result: [0, 1, 0, 0] Count: 1

At step 216, the Partition Criterion BitSet is computed by performing a logical AND operation between the Partition FT Criterion BitSet with the Partition AT Criterion BitSet:

AND Partition 1 FT Criterion BitSet ([1, 1, 0, 0]) with Partition 1 AT Criterion BitSet ([1, 1, 0, 0]).
    Result: [1, 1, 0, 0] Count: 2

The above process is then repeated for Partition 2.
Step 210: Create Partition 2 FT Criterion BitSet:
Create FT-FV and then FT BitSets for FTs in Criterion:

FT$_1$:

FT$_1$-100: [1, 1, 0] Count: 2
FT$_1$: Use BitSet for FT$_1$-100: [1, 1, 0] Count: 2

FT$_2$:

FT$_2$-300: [1, 1, 0] Count: 2
FT$_2$-800: [0, 0, 0] Count: 0

-continued

FT$_2$: OR FT-FV BitSets for FT$_2$-300 ([1, 1, 0]) and FT$_2$-800 ([0, 0, 0]):
  [1, 1, 0] Count:2

FT$_3$:

FT$_3$-900: NOT([0, 0, 0]) [1, 1, 1]
Count: 3
FT$_3$-950: NOT([0, 0, 0]) [1, 1, 1]
Count: 3
FT$_3$: FT$_3$-900 and FT$_3$-950 do not exist, use BitSet (0) ([0, 0, 0]) for each, NOT each one, and finally AND the results: NOT ([0, 0, 0]) AND NOT([0, 0, 0]) = [1, 1, 1] AND [1, 1, 1]:
  [1, 1, 1] Count: 3
AND these FT BitSets to create Partition 2 FT Criterion BitSet:
  [1, 1, 0]

Step 212: Create Partition 2 AT Criterion BitSet:

As AT<=2.0 in Criterion, the AVs to be used in Partition 2 are 1.2 and 1.8, with Partition 1-AV BitSets of [1, 0, 0] and [0, 0, 1] respectively.

AND-ing each with FT Criterion BitSet ([1, 1, 0]) results in:

1.2: [1, 0, 0] AND [1, 1, 0] [1, 0, 0]
Count: 1
1.8: [0, 0, 1] AND [1, 1, 0] [0, 0, 0]
Count: 0
OR-ing results in Partition 2 AT Criterion BitSet: [1, 0, 0]
Count: 1

Step 214—Process AT-AV BitSet—Create Partition 2 AV Match BitSet:

1.2: AND Partition 2 AV BitSet ([1, 0, 0]) with FT Criterion BitSet ([1, 1, 0]):
  Result: [1, 0, 0] Count: 1
1.8: AN Partition 2 AV BitSet ([0, 0, 0]) with FT Criterion BitSet ([1, 1, 0]):
  Result: [0, 0, 0] Count: 0

Step 216—Create Partition 2 Criterion BitSet:

AND Partition 2 FT Criterion BitSet ([1, 1, 0]) with Partition 2 AT Criterion
BitSet ([1, 0, 0]).
  Result: [1, 0, 0] Count: 1

Once steps 210-216 have been computed for both Partition 1 and Partition 2, the forecasts can be computed at step 218 (e.g., as detailed in FIG. 7). Referring to FIG. 7, the total matched count is computed at step 702:

Total Matched Count=Partition 1 Criterion FT BitSet ([1, 1, 0, 0]) Count (2)+Partition 2 Criterion FT BitSet ([1, 0, 0]) Count (1)=3.

At step 704, the normalized total matched count (that is normalized per unit of time) is computed:

Total Matched Count normalized per unit of time=3*9/2=13.5.

At step 706, the total event count is calculated: 7.
At step 708, the average AV is computed:
[(1*1.2+1*1.8)+(1*1.2)]/3=1.4.
At step 710, the most restrictive portion of the Criterion 118 is determined.

In this regard, the most restrictive FT is the one with smallest count:
  FT$_1$-100: 2 (Partition 1)+2 (Partition 2)=4
  FT$_1$: 2 (Partition 1)+2 (Partition 2)=4

FT$_2$-300: 3 (Partition 1)+2 (Partition 2)=5
FT$_2$-800: 0 (Partition 1)+0 (Partition 2)=0
FT$_2$: 3 (Partition 1)+2 (Partition 2)=5
FT$_3$-900: 4 (Partition 1)+3 (Partition 2)=7
FT$_3$-950: 4 (Partition 1)+3 (Partition 2)=7
FT$_3$: 4 (Partition 1)+3 (Partition 2)=7

Based on these counts, one may determine that the most restrictive FT is FT$_1$. The next restrictive FT is FT$_2$, and within it, the most restrictive FV is 800. But given 300 is OR-ed with 800, the restrictiveness of 800 is neutralized.

Based on the above, Table G illustrates the exemplary Output for the Example with Criterion 1.

TABLE G

Output for Example Criterion 1

Criterion 1:
Forecast = Total Matched Count*Criterion Span/
Partitions Span = 3*9/2 = 13.5
Forecast as % of Total Events = Total Matched Count/
Events in Event Set = 3/7 = 43%
Average AV= 1.4.
FT$_1$ matches 4/7 of Events = 57%
FT$_2$ matches 5/7 of Events = 71%
FT$_3$ matches 7/7 of Events = 100%

Example 2—Criterion 2

As illustrated in Table A, the same Events 104 described above are input at step 202. However, the Criterion 118 for this example differ. The Criterion 118 input at step 202 in this example is:

FT$_1$=100 AND FT$_2$=300, 800 AND FT$_3$ NOT IN (900, 950)

Criterion Span=9

Since the Event Set 102 are the same in both examples, steps 204-208, described above with respect to the Example 1—Criterion 1, produce the same results for this Example. The examples differ in their processing for steps 210-218 as the Criteria 118 in the examples differ.

At step 210, the Partition 1 FT Criterion BitSet is created with the same result as with Criterion 1:

Result: Partition 1 FT Criterion BitSet: [1, 1, 0, 0]

At step 212, the Partition 1 AT Criterion BitSet is computed by performing a logical AND operation between the AV BitSets and the FT Criterion BitSet ([1, 1, 0, 0]):

1.2: [1, 0, 0, 0] AND [1, 1, 0, 0]   [1, 0, 0, 0]   Count: 1
1.4: [0, 0, 0, 1] AND [1, 1, 0, 0]   [0, 0, 0, 0]   Count: 0
1.8: [0, 1, 0, 0] AND [1, 1, 0, 0]   [0, 1, 0, 0]   Count: 1
2.4: [0, 0, 1, 0] AND [1, 1, 0, 0]   [0, 0, 0, 0]   Count: 0

At step 214, the AT-AV BitSet is processed. As no AT is provided in the Criterion 118, all AVs are used:

1.2: AND Partition 1 AV BitSet ([1, 0, 0, 0]) with FT Criterion BitSet ([1, 1, 0, 0]):
  Result: [1, 0, 0, 0] Count: 1
1.4: AND Partition 1 AV BitSet ([0, 0, 0, 1]) with FT Criterion BitSet ([1, 1, 0, 0]):
  Result: [0, 0, 0, 0] Count: 0

-continued 1.8: AND Partition 1 AV BitSet ([0, 1, 0, 0]) with FT Criterion BitSet ([1, 1, 0, 0]):
  Result: [0, 1, 0, 0] Count: 1
2.4: AND Partition 1 AV BitSet ([0, 0, 1, 0]) with FT Criterion BitSet ([1, 1, 0, 0]):
  Result: [0, 0, 0, 0] Count: 0

At step 216, the Partition 1 Criterion BitSet is created. Since an AT is not provided in the Criterion 118, the FT Criterion BitSet ([1, 1, 0, 0]) is used. The bits are summed to generate the count of Events 104 in the Partition 112 matching the AV available in the Events 104:

Result: [1, 1, 0, 0] Count: 2

The process of steps 210-216 are then repeated for Partition 2. At step 210, the Partition 2 FT Criterion BitSet is created. For the Criterion 2, the results is the same as in Example 1 above:

Result: Partition 2 FT Criterion BitSet: [1, 1, 0]

At step 212, the Partition 2 AT Criterion BitSet is computed:

AND AV BitSets with FT Criterion BitSet ([1, 1, 0]):
1.2: [1, 0, 0] AND [1, 1, 0] [1, 0, 0] Count: 1
1.8: [0, 0, 1] AND [1, 1, 0] [0, 0, 0] Count: 0
2.5: [0, 1, 0] AND [1, 1, 0] [0, 1, 0] Count: 1

At step 214, the AT-AV BitSet is processed. First, the Partition 2 AV Match BitSet is created:

1.2: AND Partition 2 AV BitSet ([1, 0, 0])
               with FT Criterion BitSet ([1, 1, 0]):
  Result: [1, 0, 0] Count: 1
2.5: AND Partition 2 AV BitSet ([0, 1, 0])
               with FT Criterion BitSet ([1, 1, 0]):
  Result: [0, 1, 0] Count: 1
1.8: AND Partition 2 AV BitSet ([0, 0, 1])
               with FT Criterion BitSet ([1, 1, 0]):
  Result: [0, 0, 0] Count: 0

As part of step 214, the Partition 2 Criterion BitSet is created. Since no AT is provided, the Partition 2 FT Criterion BitSet is used for this step and the bits are summed:

Just use FT Criterion BitSet ([1, 1, 0]).
Result: [1, 1, 0] Count: 2

Once steps 210-216 are performed for both Partitions 112, the forecasts may be computed:

Compute Total Matched Count:

Total Matched Count=Partition 1 Criterion BitSet ([1, 1, 0, 0]) Count (2)+Partition 2 Criterion BitSet ([1, 1, 0]) Count (2)=4.

Compute Total Matched Count Normalized Per Unit of Time:

Total Matched Count normalized per unit of time=$4*9/2$=18.

Total Count of Events in Event Set:

7.

Compute Average AV:

$[(1*1.2+1*1.8)+(1*1.2+1*2.5)]/4=1.675$.

Calculate Most Restrictive:

Same as in Example 1 above.

Based on the forecast computations, the process may output the forecasts. An exemplary output for Example 2—Criterion 2 is illustrated in Table H.

TABLE H

| Output for Example Criterion 2 |
| --- |
| Criterion 2:<br>Forecast = $4*9/2$ = 18<br>Forecast as % of Total Events = 4/7 = 57%.<br>Average AV = 1.675.<br>FT1 matches 4/7 = 57%<br>FT2 restricts forecast by 5/7 = 71%<br>FT3 restricts forecast by 7/7 = 100% |

INDUSTRY SPECIFIC EXAMPLES

Embodiments of the invention may be utilized in various different domains/industries. Table I below illustrates various exemplary domains/industries, how the different inputs/elements map to such an industry, and an exemplary/primary/main use case for that industry/domain.

TABLE I

| Industry | Equivalence/Mapping | Main Use Case |
| --- | --- | --- |
| Digital Advertising | Event: A request for a bid or purchased/won impressions.<br>Criterion: An (advertising) campaign with targeting information,<br>Feature Type: Targeting dimensions for placement of the impression such as Time of Day, End User's current Geographic Location or GPS coordinates, Operating System of End User's device, End User Age, End User Behaviors, Site Context, etc.<br>Aggregate Type: Price. | Forecasting count and accurate average price of specific segment of inventory. An adveritsing campaign may be generated based on the forecasting and the campaign acquires and places advertisements in the impressions |
| Search (written or auditory) | Event: Written, spoken or thought out words.<br>Criterion: Searching frequency of usage of certain words. | Forecasting count of specific words. Search results |

TABLE I-continued

| Industry | Equivalence/Mapping | Main Use Case |
| --- | --- | --- |
| | Feature Type: Targeting dimensions such as Time of Day, End User's current Geographic Location or GPS coordinates, End User Age, End User Behaviors, Context category, etc. Aggregate Type: Price. | provided may then be generated based on the forecasting selected and further provided to end users/consumers. |
| Agri-Business | Event: Input from sensors spread across a land. Criterion: A query mearsuring area within a specific temperature, humidity, sunshine, etc. Feature Types: Region, altitude, coastal vs. Inline, etc. Aggregate Type: Temperature or humidity guage values. | Forecasting count of minutes, hours, days within specific temperature or humidity levels. The forecasting can be used to generate an agriculture design/schedule that is used to physically plant agriculture in particular geograhpic locations and times of year. |
| Aircraft Design | Event: Input from Sensors Criterion: A query measuring wind velocity and pressure Feature Types: Wind velocity Aggregate Type: Wingtip pressure. | Forecasting maximum velocity while maintaining pressure below threshold. The aircarft design may be generated and utilized to construct (part of) an aircraft. |

HARDWARE EMBODIMENTS

Figure 8:
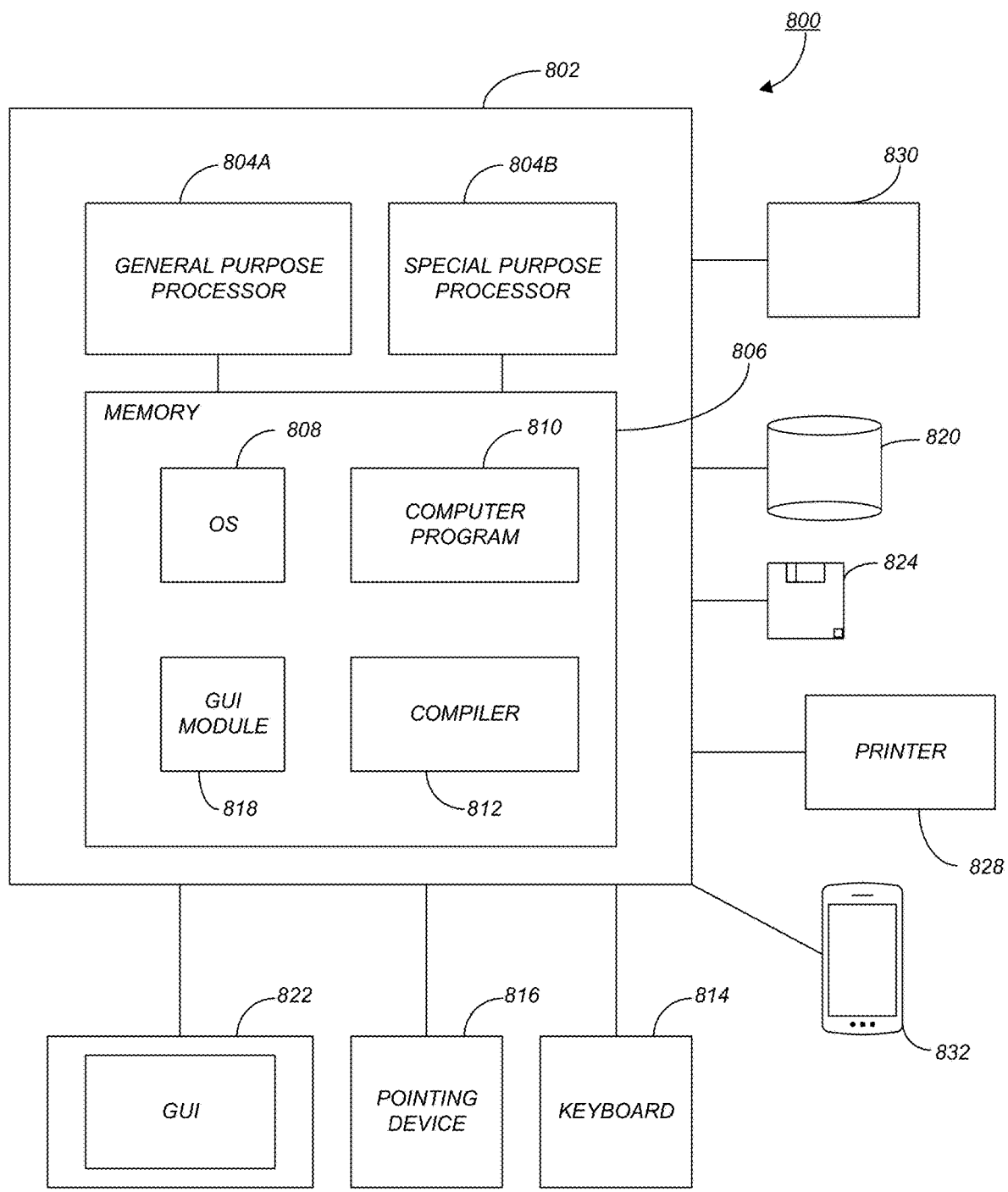
FIG. 8 is an exemplary hardware and software environment used to implement one or more embodiments of the invention.

FIG. 8 is an exemplary hardware and software environment 800 used to implement one or more embodiments of the invention. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. Processors 804A and 804B may be multi-core processors, that may operate on a bus size that could be 64-bit, or higher. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
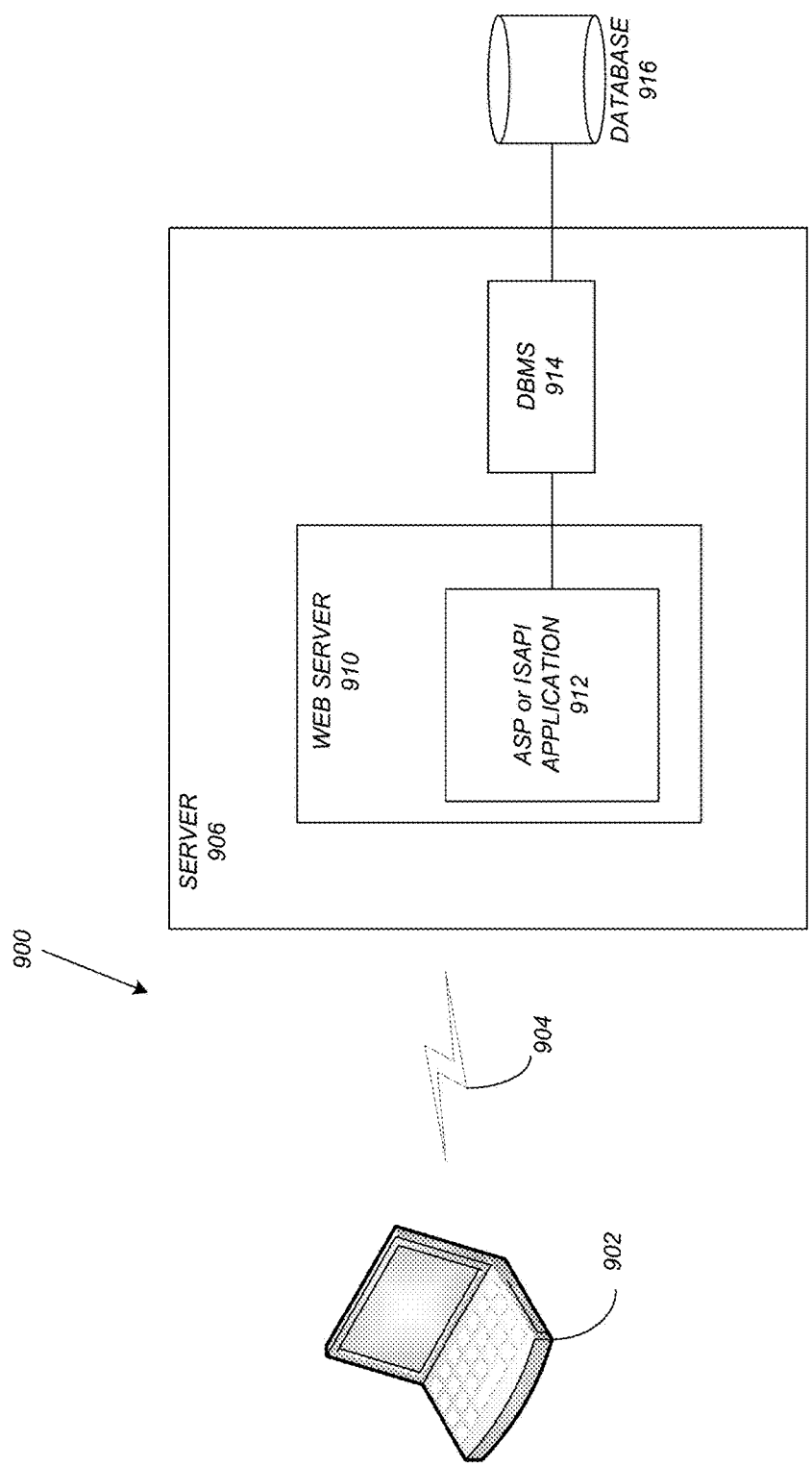
FIG. 9 schematically illustrates a typical distributed/cloud-based computer system using a network to connect client computers to server computers in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

In one or more embodiments of the invention, server computer 906 may be advertising servers that perform all of the steps described above. In this regard, an advertising server may provide forecasting to potential purchasers as part of an advertising campaign strategy and/or to determine an advertising campaign strategy before bids are actually placed (e.g. in an advertising auction). Similarly, the various steps may be performed on a local client application that is performing the forecasting. Additional examples of such forecasting include use in the search industry to determine a count of specific words for use in determining user demographics/advertisement targeting, in the agriculture business to analyze geographic areas to forecast environmental conditions during given months/days/time, and/or in the vehicle/industrial design industry to forecast/analyze the effects of environmental conditions such as wind and rain on a vehicular design such as the maximum velocity of an aircraft design while maintaining pressure on elements of the design [e.g., wingtip] below a certain threshold, etc.).

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software application on a client 902 or server computer 906. Further, as described above, the client 902 or server computer 906 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Embodiments of the invention enable forecasting by reducing the complexity of computing a count of events, an accurate average aggregate value for those events, and a breakdown of feature type restrictiveness in criterion. For example, in one or more embodiments, the Pessimistic Optimized Complexity=O (Event Count/64*Criterion Feature Type Count at Partition*ROUNDUP(Count of Partition/CPU Core Count).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for forecasting events that match a criterion comprising:
   (a) receiving input, wherein:
      (1) the input comprises an event set and a criterion;
      (2) the event set comprises one or more events;
      (3) each of the one or more events comprises a record with one or more features;
      (4) each of the one or more features comprises an instance of a feature type (FT) and feature value (FV) combination;
      (5) the criterion comprises a logical statement that specifies a criterion FT, a criterion FV, and an operator;
   (b) partitioning the event set into one or more partitions;
   (c) building a partition BitSet for each of the one or more partitions, wherein each partition length of each partition BitSet is based on a number of the one or more events in the partition represented by that partition BitSet;
   (d) based on the partition BitSets, creating a partition FT-FV count that lists a number of occurrences of each FV within a partition-FT combination;
   (e) for each partition, computing a partition FT criterion BitSet;
   (f) for each partition, computing a partition Criterion BitSet based on the partition FT criterion BitSet; and
   (g) computing the forecast based on the partition Criterion BitSet.

2. The computer-implemented method of claim 1, wherein:
   the partitioning comprises:
      determining a partition key; and
      partitioning the event set into the partitions based on the partition key.
   the partition key serves to reduce a total count of the one or more events in each of the one or more partitions; and
   the partition key splits the one or more events, count-wise, in a distributed manner across the one or more partitions.

3. The computer-implemented method of claim 1, wherein the building the partition BitSet comprises:
   gathering the FTs in the one or more features into a partition feature type definition; and
   for each of the FT-FV combinations, starting with a BitSet of all zeroes (0), setting a bit at position (P) to 1 when the FT-FV combination is found in the event (E) represented by position (P).

4. The computer-implemented method of claim 1, wherein the computing a partition FT criterion BitSet comprises:
   for each FT-FV criterion combination within the criterion, assembling a FT-FV Criterion BitSet and computing a FT-FV criterion count for each FT-FV Criterion BitSet, wherein:
      a number of bits in the FT-FV Criterion BitSet corresponds to a number of events in the partition; and
      for each FT-FV Criterion combination, starting with a FT-FV Criterion BitSet of all zeroes (0), setting a bit at position (P) to 1 when the FT-FV Criterion combination is found in the event (E) represented by position (P);
   for each FT-FV Criterion combination having a common FT, combining the FT-FV Criterion BitSets to create a single FT criterion BitSet by:
      when the operator for the FT-FV combination comprises an "=" intra-feature type operator, performing a logical OR operation between the FT-FV Criterion BitSets being combined;

when the operator for the FT-FV combination comprises a "!=" intra-feature type operator:
performing a logical NOT operator against the FT-FV Criterion BitSets; and
performing a logical AND operator between the FT-FV Criterion BitSets being combined; and
computing the partition FT criterion BitSet by applying a logical AND operator or a logical OR operator combining the single FT criterion BitSets, wherein the logical AND operator or the logical OR operator applied is based on an inter-feature type operator used between criterion FT-criterion FV combinations in the criterion.

5. The computer-implemented method of claim 1, wherein:
the input comprises an aggregate;
the aggregate comprises an instance of a combination of an aggregate type (AT) and an aggregate value (AV);
the method further comprises building a partition AT-AV BitSet by:
for each of the AT-AV combinations, starting with a partition AT-AV BitSet of all zeroes (0), setting a bit at position (P) to 1 when an AT-AV combination is found in the event (E) represented by position (P); and
based on the partition AT-AV BitSets, creating a partition AT-AV count that lists a number of occurrences of each AV within a partition's AT-AV combination.

6. The computer-implemented method of claim 5, further comprising computing a partition AT Criterion BitSet by:
based on the partitioned AT-AV BitSets, selecting one or more AVs; and
for each selected AV, performing a logical AND operation between the partition AT-AV BitSet and the partition FT criterion BitSet; and
computing the partition AT Criterion BitSet by applying a logical OR operation across results from the logical AND operation between the partition AT-AV BitSet and the partition FT criterion BitSet.

7. The computer-implemented method of claim 6, further comprising computing a partition AV Match BitSet by:
for each partition AT-AV BitSet within each partition:
if the criterion includes an AT-AV and a range, use only events having AT-AVs within the range of the AT-AV specified;
if the criterion does not include the AT-AV and the range, use all AT-AVs; and
computing the partition AV Match BitSet by applying a logical AND operator between the partition FT criterion BitSet and the partition AT-AV BitSet.

8. The computer-implemented method of claim 7, wherein the computing the partition Criterion BitSet based on the partition FT criterion BitSet comprises:
if the criterion comprises an AT, computing the partition Criterion BitSet by performing a logical AND operation between the Partition FT Criterion BitSet and the Partition AT Criterion BitSet;
if the criterion does not comprise an AT, the partition Criterion BitSet comprises the Partition FT Criterion BitSet; and
summing bits in the partition Criterion BitSet to generate a count of the one or more events in the partition matching the one or more events that match the AV.

9. The computer-implemented method of claim 7, wherein the computing the forecast based on the partition Criterion BitSet comprises:
summing counts from each partition Criterion FT BitSet to produce a Total Matched Count;
computing a Total Matched Count per normalized unit of time by multiplying the Total Matched Count by a Criterion Span in the Criterion and dividing by an Event Set Span;
using all AV Matches for the criterion, computing an accurate average AV; and
for each FT-FV combination in the criterion, determining a most restrictive portion of the Criterion based on FT counts and FV counts.

10. The computer-implemented method of claim 1, wherein:
the event comprises a request for an impression;
the criterion comprises an advertising campaign with targeting information;
the feature type comprises targeting dimensions for placement of the impression;
the event further comprises an aggregate having an aggregate type that is a price;
the forecasting comprises forecasting a count and accurate average price of a specific segment of impression inventory; and
the method further comprises generating an advertising campaign based on the forecasting, wherein the advertising campaign acquires and places one or more advertisements in the impression.

11. The computer-implemented method of claim 1, wherein:
the event comprises sensor input;
the criterion comprises a query measuring wind velocity and pressure;
the feature type comprises wind velocity;
the event further comprises an aggregate having an aggregate type that is a wingtip pressure of an aircraft;
the forecasting comprises forecasting a maximum velocity while maintaining a pressure below a threshold; and
the method further comprises generating an aircraft design and utilizing the aircraft design to construct a part of an aircraft.

12. A system for forecasting events that match a criterion comprising:
(a) a server computer having a processor; and
(b) an application executing on the server computer that:
(1) receives input, wherein:
(A) the input comprises an event set and a criterion;
(B) the event set comprises one or more events;
(C) each of the one or more events comprises a record with one or more features;
(D) each of the one or more features comprises an instance of a feature type (FT) and feature value (FV) combination; and
(E) the criterion comprises a logical statement that specifies a criterion FT, a criterion FV, and an operator;
(2) partitions the event set into one or more partitions;
(3) builds a partition BitSet for each of the one or more partitions, wherein each partition length of each partition BitSet is based on a number of the one or more events in the partition represented by that partition BitSet;
(4) based on the partition BitSets, creates a partition FT-FV count that lists a number of occurrences of each FV within a partition-FT combination;
(5) for each partition, computes a partition FT criterion BitSet;

(6) for each partition, computes a partition Criterion BitSet based on the partition FT criterion BitSet; and
(7) computes the forecast based on the partition Criterion BitSet.

13. The system of claim 12, wherein:
the application partitions by:
   determining a partition key; and
   partitioning the event set into the partitions based on the partition key;
the partition key serves to reduce a total count of the one or more events in each of the one or more partitions; and
the partition key splits the one or more events, count-wise, in a distributed manner across the one or more partitions.

14. The system of claim 12, wherein the application builds the partition BitSet by:
gathering the FTs in the one or more features into a partition feature type definition; and
for each of the FT-FV combinations, starting with a BitSet of all zeroes (0), setting a bit at position (P) to 1 when the FT-FV combination is found in the event (E) represented by position (P).

15. The system of claim 12, wherein the application computes a partition FT criterion BitSet by:
for each FT-FV criterion combination within the criterion, assembling a FT-FV Criterion BitSet and computing a FT-FV criterion count for each FT-FV Criterion BitSet, wherein:
   a number of bits in the FT-FV Criterion BitSet corresponds to a number of events in the partition;
   for each FT-FV Criterion combination, starting with a FT-FV Criterion BitSet of all zeroes (0), setting a bit at position (P) to 1 when the FT-FV Criterion combination is found in the event (E) represented by position (P);
for each FT-FV Criterion combination having a common FT, combining the FT-FV Criterion BitSets to create a single FT criterion BitSet by:
   when the operator for the FT-FV combination comprises an "=" intra-feature type operator, performing a logical OR operation between the FT-FV Criterion BitSets being combined;
   when the operator for the FT-FV combination comprises a "!=" intra-feature type operator:
      performing a logical NOT operator against the FT-FV Criterion BitSets; and
      performing a logical AND operator between the FT-FV Criterion BitSets being combined; and
computing the partition FT criterion BitSet by applying a logical AND operator or a logical OR operator combining the single FT criterion BitSets, wherein the logical AND operator or the logical OR operator applied is based on an inter-feature type operator used between criterion FT-criterion FV combinations in the criterion.

16. The system of claim 12, wherein:
the input comprises an aggregate;
the aggregate comprises an instance of a combination of an aggregate type (AT) and an aggregate value (AV); and
the application builds a partition AT-AV BitSet by:
   for each of the AT-AV combinations, starting with a partition AT-AV BitSet of all zeroes (0), setting a bit at position (P) to 1 when an AT-AV combination is found in the event (E) represented by position (P); and
   based on the partition AT-AV BitSets, creating a partition AT-AV count that lists a number of occurrences of each AV within a partition's AT-AV combination.

17. The system of claim 16, wherein the application further computes a partition AT Criterion BitSet by:
based on the partitioned AT-AV BitSets, selecting one or more AVs;
for each selected AV, performing a logical AND operation between the partition AT-AV BitSet and the partition FT criterion BitSet; and
computing the partition AT Criterion BitSet by applying a logical OR operation across results from the logical AND operation between the partition AT-AV BitSet and the partition FT criterion BitSet.

18. The system of claim 17, wherein the application further computes a partition AV Match BitSet by:
for each partition AT-AV BitSet within each partition:
   if the criterion includes an AT-AV and a range, use only events having AT-AVs within the range of the AT-AV specified;
   if the criterion does not include the AT-AV and the range, use all AT-AVs; and
   computing the partition AV Match BitSet by applying a logical AND operator between the partition FT criterion BitSet and the partition AT-AV BitSet.

19. The system of claim 18, wherein the application computes the partition Criterion BitSet based on the partition FT criterion BitSet by:
if the criterion comprises an AT, computing the partition Criterion BitSet by performing a logical AND operation between the Partition FT Criterion BitSet and the Partition AT Criterion BitSet;
if the criterion does not comprise an AT, the partition Criterion BitSet comprises the Partition FT Criterion BitSet; and
summing bits in the partition Criterion BitSet to generate a count of the one or more events in the partition matching the one or more events that match the AV.

20. The system of claim 18, wherein the application computes the forecast based on the partition Criterion BitSet by:
summing counts from each partition Criterion FT BitSet to produce a Total Matched Count;
computing a Total Matched Count per normalized unit of time by multiplying the Total Matched Count by a Criterion Span in the Criterion and dividing by an Event Set Span;
using all AV Matches for the criterion, computing an accurate average AV; and
for each FT-FV combination in the criterion, determining a most restrictive portion of the Criterion based on FT counts and FV counts.

* * * * *